United States Patent Office 3,224,888
Patented Dec. 21, 1965

3,224,888
REFRACTORY COMPOSITION AND PROCESS FOR MAKING SAME
Paul Metz, Dudelange, Grand-Duchy of Luxembourg, assignor to ARBED, Aciéries Réunies de Burbach-Eich-Dudelange, S.A., Luxembourg, Luxembourg, a corporation of Luxembourg
No Drawing. Filed July 13, 1961, Ser. No. 123,619
Claims priority, application Luxembourg, July 15, 1960, 38,955
6 Claims. (Cl. 106—56)

My present invention relates to a refractory composition in comminuted form, adapted to be used as a component in the manufacture of heat-resistant bodies therefrom, and to a process for making such composition.

In the manufacture of refractory articles it is customary to start with a mass of ceramic particles composed of fractions of various sizes which are obtained, in accordance with established principles of grain sizing, by the comminution of a body of sintered or fused granules of natural minerals such as native magnesites or dolomites or sea-water magnesite. The original granules are brought to partial or complete coalescence by heating to temperatures of, say, 1500° to 2000° C. or by electric-arc melting; the products of comminution are compacted by tamping, pressure and/or vibration, with or without an organic binder, and fired either before or after shaping into final form.

As also pointed out in my concurrently filed U.S. application Ser. No. 123,844, entitled "Process for Producing Bodies of Refractory Material," the refractories of an article so manufactured depends to a large extent upon the proportion of elemental carbon present in the material, i.e. between the grains thereof as also within the interior of the grains. It is, therefore, the general object of the present invention to provide an improved compostion with a more effective carbon content for the purpose set forth, as well as a simple and relatively inexpensive process for making such composition.

I have found, in accordance with the present invention, that this object can be realized by first subjecting the granular starting material to a decarbonating heat treatment resulting in an at most lightly sintered mass with a porosity (in terms of void/solid volumetric ratio) of not less than 20% and preferably above 50%, impregnating the mass thus obtained with one or more thermally unstable carbon compounds leaving a residue of elemental carbon upon heating, especially bituminous hydrocarbons, and subsequently heating the impregnated mass to at least partial coalescence of its particles (i.e. sintering or complete fusion), at a temperature higher than that at which the hydrocarbons are decomposed to leave a residue of free carbon.

Advantageously, in accordance with a further feature of the invention, the graphitization or carbonization of the hydrocarbon impregnant is enhanced by an intermediate heating, to a temperature less than that of the sintering step, to decompose the impregnant. This coking operation may be carried out at temperatures of the order of 350° to 1000° C. and, if desired, may be repeated one or more times. Finely divided elemental carbon e.g. graphite, may be added to supplement the hydrocarbon impregnant.

The coking of an organic binder in a ceramic mass previously subjected to preliminary sintering, prior to a final sintering operation at high temperatures, has been disclosed in my copending U.S. application Ser. No. 23,371, filed April 20, 1960, now U.S. Patent No. 3,111,415.

The intermediate and final heating steps should be carried out in a non-oxidizing (i.e. inert or reducing) environment. The heat needed for the coking and final sintering or fusion may be at least partly derived from combustion of the impregnating hydrocarbon, though it is also possible and often convenient to utilize for this operation an electric current passed directly through the mass which has been rendered sufficiently conductive by the carbon liberated in the preceding coking step or steps, as more fully disclosed and claimed in my concurrently filed U.S. application Ser. No. 123,855, entitled "Process for Making Refractory Articles." As likewise described in that application, the properties of the sintered body may be further improved by compacting it, through compression and/or vibration, during the final heat treatment.

If the same oven is used for the intermediate and final heating operations, the temperature of the heating chamber after a prior sintering may be high enough to accomplish the coking of a further batch of hydrocarbon/ceramic mixture subsequently introduced.

In many instances it will be desirable to carry out either or both heating steps under pressure, e.g. at absolute pressures of at least 1.5 atmospheres as described in my first-mentioned concurrently filed application, to increase the carbon yield and to prevent the loss of both carbon and magnesia at the high firing temperatures.

It should be understood that the comminuted composition obtained by the fragmentation of a sintered body treated in accordance with this invention, consisting of particles with an appreciable carbon content, need not constitute the entire building material for the subsequent formation of sintered refractory articles but may, if desired, serve as only a component of such building material, e.g. as a fine-grain fraction filling the interstices between larger particles admixed therewith.

The hydrocarbons employed are advantageously bituminous substances obtained from coal-tar or petroleum distillation, e.g. fractions boiling between about 150° or preferably 250° to 400° C. at atmospheric pressure. They may, in particular, have been subjected prior to impregnation to a preliminary heat treatment at a temperature between substantially 150° and 500° C. under an absolute pressure upward of two atmospheres as disclosed and claimed in my concurrently filed U.S. application Ser. No. 123,613, entitled "Organic Binder and Process for Making Same." Other, especially heavier bituminous or synthetic carbon compounds, which are thermally instable so as to leave a carbon residue upon heating, may also be used with or without conventional condensing or polymerizing catalysts for promoting the liberation of carbon, e.g. ethylene or other fluids capable of forming free radicals.

In all cases it will be desirable to subject the decarbonized and/or presintered mass to a vacuum treatment before each impregnation or reimpregnation and coking step, in order to facilitate the absorption of the impregnant by the ceramic particles.

The following examples are illustrative of the manner in which the invention may be carried into practice.

*Example I*

Crude dolomite in lumps of 10 to 40 mm. particle size is heated to about 1300° C. so as to yield a decarbonated and lightly sintered mass with a porosity of the order of 35%. The resulting basic oxide is then cooled to 150° C. and, after being subjected to a vacuum, is impregnated by a mixture of bituminous hydrocarbons boiling between 250° and 400° C., being thereafter fired at 1800° C. under non-oxidizing conditions. The sintered dolomite so produced is comminuted to the desired particle sizes so as to form a granular composition which can be mixed with tar and shaped by vibration and/or compression, prior to or after resintering, into a finished article. Refractory bricks as well as larger integral bodies, such as blocks or converter bottoms, may be produced in this manner.

Example II

Dolomite or magnesite lumps of 10 to 15 mm. particle size are decarbonated at 1100° or 900° C., respectively, to produce a mass of high porosity which is impregnated with tar heated to 100° C.; the mixture is then reheated in a nitrogen atmosphere to 600° C., cooled to 100° C., reimpregnated, again heated to 600° C. and thereafter, upon completion of the coking reaction, fired at 1800° C. The sintered body thus obtained is ground to a meal with a particle size below 2 mm.; 45 parts (by weight) of this meal are mixed with 55 parts of refractory granules of 2 to 20 mm. particle size produced from conventionally sintered dolomite, magnesite and/or magnesium chromite, the mixture being then impregnated with tar or pitch, in a proportion of 6 to 9% by weight, in a blender which forms it into a plastic mass. The latter is shaped into bricks, blocks or other articles, as mentioned in the preceding example, which can be cured prior to shaping or thereafter (e.g. by being positioned raw in a converter as a lining therefor).

Example III

A particulated ceramic material rich in magnesium compounds, such as dolomite or, preferably, native or sea-water magnesite, is preheated to a moderate temperature so as to form a lightly sintered body with a porosity of at least 25%. This body is permeated by tar, as heretofore described, and heated in nitrogen to 800° C. so that the liberated elemental carbon therein renders it sufficiently conductive to pass a heating current therethrough. The body is then heated with the aid of such current, as more fully described in my above-identified application entitled "Process for Making Refractory Articles," to a temperature of approximately 2000° C.; this results in a very tight sintering of the particles and in a graphitization of the carbon. During or immediately after sintering, preferably while still at or near its highest temperature, the body may be compacted by pressure and/or vibration to increase its density; the electrical resistance of the carbon/ceramic mixture may be further reduced, if needed, by the inclusion of lumps of graphite or silicon carbide therein preparatorily to connecting it in the heating circuit.

Again, as in the preceding examples, the sintered mass is comminuted to a desired particle size or range of such sizes for subsequent shaping into the finished article, either alone or in admixture with conventional granular fractions; thus, for instance, it may be ground to a particle size below 0.5 or 2 mm. and blended with a coarser fraction, consisting of large grains of dolomite, magnesite and/or magnesium chromite, as well as tar or pitch to form a moldable and curable plastic mass.

Example IV

A ceramic starting material as specified above, in powdered form, is admixed with tar and pressed into blanks which are heated to 800° C. whereby their conductivity is increased to a point enabling their heating by an internal electric current. The further treatment is the same as in the preceding example.

I claim:
1. A process for making a refractory composition, comprising the steps of preheating a particulate ceramic material, selected from the group which consists of native and sea-water calcined magnesites and dolomites, to a decarbonating temperature lower than that at which said material is sintered into a mass having a porosity less than substantially 20%, impregnating the material so treated with at least one thermally decomposable liquid bituminous hydrocarbon having a boiling point between substantially 150° and 400° C., heating the impregnated material to a temperature of at least partial particle coalescence higher than that at which said hydrocarbon is sufficiently decomposed to leave in said particles a residue of elemental carbon, recomminuting the resulting body of at least partially coalesced particles, admixing the recomminuted material with a binder selected from the group which consists of tar and pitch and thereafter shaping the mixture of recomminuted material and binder preparatorily to a firing thereof.

2. A process according to claim 1 wherein the preheating step is terminated at a temperature at which said mass has a porosity of at least 50%.

3. A process according to claim 1 wherein said heating step is effected by heating the impregnated mass to a relatively low temperature to coke said hydrocarbon and, heating said mass to a relatively high temperature for causing said coalescence of said particles.

4. A process according to claim 3 wherein said mass is heated to said relatively low and said relatively high temperature in a non-oxidizing environment.

5. A process according to claim 4 wherein the heating to said relatively low and relatively high temperatures is carried out under pressure greater than atmospheric.

6. A process according to claim 3 wherein said mass is heated to said relatively high temperature with the aid of a current passed directly through it.

References Cited by the Examiner
UNITED STATES PATENTS

| | | | |
|---|---|---|---|
| 2,952,605 | 9/1960 | De Varda | 106—58 |
| 2,015,850 | 1/1962 | Rusoff et al. | 106—56 |
| 3,030,228 | 4/1962 | Hernandez et al. | 106—58 |

TOBIAS E. LEVOW, *Primary Examiner.*
JOSEPH REBOLD, *Examiner.*